(12) United States Patent
Ishii et al.

(10) Patent No.: US 9,371,254 B2
(45) Date of Patent: Jun. 21, 2016

(54) MANUFACTURING METHOD OF HONEYCOMB STRUCTURE

(71) Applicant: NGK Insulators, Ltd., Nagoya (JP)

(72) Inventors: Yutaka Ishii, Nagoya (JP); Kazunari Akita, Nagoya (JP); Yoshihiro Sato, Nagoya (JP); Masayuki Nate, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 14/618,178

(22) Filed: Feb. 10, 2015

(65) Prior Publication Data

US 2015/0274602 A1 Oct. 1, 2015

(30) Foreign Application Priority Data

Mar. 25, 2014 (JP) ................. 2014-061484

(51) Int. Cl.
*C03B 29/00* (2006.01)
*C04B 37/00* (2006.01)
(Continued)

(52) U.S. Cl.
CPC ........ *C04B 38/0016* (2013.01); *B01D 29/0093* (2013.01); *B01D 46/0001* (2013.01); *B01D 46/2429* (2013.01); *B01D 46/2448* (2013.01); *B01D 46/2466* (2013.01); *B01J 35/04* (2013.01); *B01J 37/0009* (2013.01); *B01J 37/08* (2013.01); *B28B 1/002* (2013.01); *B32B 18/00* (2013.01); *B32B 37/00* (2013.01); *C04B 28/24* (2013.01); *C04B 37/005* (2013.01);
(Continued)

(58) Field of Classification Search
CPC .......... B32B 37/12; B32B 3/12; B32B 18/00; C04B 38/0016; C04B 38/0019; C04B 38/0009; C04B 38/0012; B28B 1/002
See application file for complete search history.

(56) References Cited

U.S. PATENT DOCUMENTS 3,991,149 A * 11/1976 Hurwitt ................ B28B 1/26
264/165
2003/0138596 A1* 7/2003 Harada .............. B01D 39/2068
428/116

(Continued)

FOREIGN PATENT DOCUMENTS

EP 2 006 010 A1 12/2008
EP 2 174 921 A1 4/2010
WO 03/031371 A1 4/2003

OTHER PUBLICATIONS

Extended European Search Report, European Application No. 15156419.2, dated Sep. 2, 2015 (5 pages).

*Primary Examiner* — Alex Efta
(74) *Attorney, Agent, or Firm* — Burr & Brown, PLLC

(57) ABSTRACT

The manufacturing method of the honeycomb structure has a forming step of forming a forming raw material into a plurality of quadrangular prismatic honeycomb formed bodies each having partition walls, a firing step of firing the plurality of honeycomb formed bodies to form a plurality of quadrangular prismatic honeycomb fired bodies, a sheet-like bonding material attaching step of attaching sheet-like bonding materials to at least part of side surfaces of at least part of the plurality of honeycomb fired bodies, a honeycomb block body preparing step of preparing a honeycomb block body in which the plurality of honeycomb fired bodies are stacked, by assembling the plurality of quadrangular prismatic honeycomb fired bodies while bonding the side surfaces thereof to one another by the bonding materials, and a grinding step of grinding a circumferential portion of the honeycomb block body to obtain the honeycomb structure.

6 Claims, 4 Drawing Sheets

(51) Int. Cl.
*C04B 38/00* (2006.01)
*B32B 37/00* (2006.01)
*B32B 18/00* (2006.01)
*C04B 28/24* (2006.01)
*B01D 29/00* (2006.01)
*B01J 35/04* (2006.01)
*B01J 37/00* (2006.01)
*B01J 37/08* (2006.01)
*B01D 46/00* (2006.01)
*B01D 46/24* (2006.01)
*B28B 1/00* (2006.01)

(52) U.S. Cl.
CPC ........ *C04B 38/0006* (2013.01); *C04B 38/0019* (2013.01); *C04B 38/0009* (2013.01); *C04B 38/0012* (2013.01); *C04B 2235/3826* (2013.01); *C04B 2235/50* (2013.01); *C04B 2235/61* (2013.01)

(56) References Cited

U.S. PATENT DOCUMENTS

| | | | |
|---|---|---|---|
| 2004/0108056 A1 | 6/2004 | Fujita et al. | |
| 2006/0150597 A1* | 7/2006 | Masukawa | B01D 46/0001 55/523 |
| 2006/0263573 A1* | 11/2006 | Okumura et al. | 428/116 |
| 2007/0092691 A1* | 4/2007 | Fujita | 428/116 |
| 2008/0318001 A1 | 12/2008 | Sakakibara | |
| 2009/0029105 A1* | 1/2009 | Masukawa | B01D 39/2086 428/116 |
| 2010/0119769 A1* | 5/2010 | Watanabe | B01D 39/2093 428/116 |
| 2010/0247851 A1* | 9/2010 | Miyata et al. | 428/116 |
| 2011/0236627 A1 | 9/2011 | Kanai | |
| 2012/0148793 A1 | 6/2012 | Sakakibara | |

\* cited by examiner

MANUFACTURING METHOD OF HONEYCOMB STRUCTURE

The present application is an application based on JP2014-061484 filed with Japan Patent Office on Mar. 25, 2014, the entire contents of which are incorporated herein by reference.

BACKGROUND OF THE INVENTION

1. Field of the Invention

The present invention relates to a manufacturing method of a honeycomb structure, and more particularly, it relates to a manufacturing method of a honeycomb structure which can improve production efficiency.

2. Description of Related Art

A ceramic honeycomb structure with excellent in thermal resistance and corrosion resistance has been employed as a carrier for a catalyst device or as a filter for use in an environmental measure, collection of specific materials or the like in each of various fields of cars, chemistry, electric power, iron and steel, and the like. Particularly, in recent years, the honeycomb structure, in which cell open ends of both end faces are alternately plugged to form the plugged honeycomb structure, has often been used as a diesel particulate filter (DPF) to trap a particulate matter discharged from a diesel engine or the like. Furthermore, as a material of the honeycomb structure for use at a high temperature under a corrosive gas atmosphere, silicon carbide (SiC), cordierite, aluminum titanate (AT) or the like which is excellent in thermal resistance and chemical stability is suitably used.

Among these materials, silicon carbide has a comparatively large thermal expansion coefficient, and hence when the honeycomb structure formed by using a large volume of silicon carbide as aggregates, defects are generated sometimes due to thermal shock during use. Furthermore, sometimes defects are generated due to thermal shock when trapped particulate matter is burned and removed. Therefore, when the honeycomb structure formed by using silicon carbide as the aggregates and having a predetermined size or more is manufactured, a plurality of small quadrangular prismatic plugged honeycomb segments (honeycomb structures) are usually first prepared. Then, an adhesive is applied to bonding surfaces of these honeycomb segments, to bond the honeycomb segments to one another, thereby manufacturing one large honeycomb structure (see Patent Document 1).

[Patent Document 1] WO 03/031371

SUMMARY OF THE INVENTION

In a manufacturing method of a honeycomb structure described in Patent Document 1, when honeycomb segments are bonded, a spacer is disposed in a space between the honeycomb segments to reduce a deviation of each space (a thickness of an adhesive (a bonding material)) between the honeycomb segments. In this method, a step of forming the spacer on the bonding surface of each honeycomb segment is required.

Furthermore, a substrate treatment is performed to the honeycomb segments, before the bonding material is applied to the honeycomb segments. In the substrate treatment, a thin slurry including a ceramic component is applied to the surface of each honeycomb segment. In consequence, it is possible to inhibit "water in the bonding material from being absorbed by the honeycomb segments when the bonding material is applied thereto", and it is possible to inhibit generation of peels or the like of the bonding material in the obtained honeycomb structure. In this manufacturing method, a step of performing the substrate treatment is required.

In addition, when the bonding material is applied to the honeycomb segments to bond the honeycomb segments to one another, the bonding material is pushed out from the space between the honeycomb segments and discharged toward end faces of the honeycomb segments. At this time, open end portions of cells opened in the end faces of the honeycomb segments are closed with the bonding material sometimes. Therefore, heretofore, a film made of a resin has been attached beforehand to each end face of the honeycomb segments so that open ends of the cells of the end faces of the honeycomb segments are not closed with the bonding material. This manufacturing method requires a step of attaching the film to each of the end faces and a step of peeling off the film from the end face.

The present invention has been developed in view of the abovementioned problems, and an object thereof is to provide a manufacturing method of a honeycomb structure which can improve production efficiency.

To achieve the above object, according to the present invention, there is provided a manufacturing method of a honeycomb structure in the following.

According to a first aspect of the present invention, a manufacturing method of a honeycomb structure having a forming step of forming a forming raw material into a plurality of quadrangular prismatic honeycomb formed bodies each having partition walls defining a plurality of cells which become through channels for a fluid and extend from one end face to the other end face is provided, a firing step of firing the plurality of honeycomb formed bodies to form a plurality of quadrangular prismatic honeycomb fired bodies, a sheet-like bonding material attaching step of attaching sheet-like bonding materials to at least part of side surfaces of at least part of the plurality of honeycomb fired bodies, a honeycomb block body preparing step of preparing a honeycomb block body in which the plurality of honeycomb fired bodies are stacked, by assembling the plurality of quadrangular prismatic honeycomb fired bodies while bonding the side surfaces thereof to one another by the bonding materials, and a grinding step of grinding a circumferential portion of the honeycomb block body to obtain the honeycomb structure, wherein a shearing strength of the obtained honeycomb structure is 200 kPa or more.

According to a second aspect of the present invention, the manufacturing method of the honeycomb structure according to the above first aspect is provided, wherein the bonding material contains agar.

According to a third aspect of the present invention, the manufacturing method of the honeycomb structure according to the above first or second aspects is provided, wherein the bonding material contains 0.08 to 0.40 mass % of the agar.

According to a fourth aspect of the present invention, the manufacturing method of the honeycomb structure according to any one of the above first to third aspects is provided, wherein the bonding material contains 20 to 45 mass % of water.

According to a fifth aspect of the present invention, the manufacturing method of the honeycomb structure according to any one of the above first to fourth aspects is provided, wherein the bonding material contains 20 to 40 mass % of a ceramic raw material.

According to a sixth aspect of the present invention, the manufacturing method of the honeycomb structure according to any one of the above first to fifth aspects is provided, wherein a thickness of the bonding material is from 0.5 to 6.0 mm.

According to a seventh aspect of the present invention, the manufacturing method of the honeycomb structure according to any one of the above first to sixth aspects is provided, wherein a compressive strength of the bonding material is from 5 to 55 N.

According to a manufacturing method of a honeycomb structure of the present invention, a bonding material is attached in the form of a sheet, and hence a space between honeycomb segments can easily be made uniform, so that it is not necessary to dispose a spacer in a space between the honeycomb segments to be bonded.

Furthermore, the bonding material is attached in the form of the sheet, and hence substrate treatments of the surfaces of the honeycomb segments can be omitted or reduced.

In addition, the side surfaces of the plurality of honeycomb segments are bonded to one another by the sheet-like bonding materials, and hence it is possible to inhibit "the bonding material sandwiched between the honeycomb segments from protruding from the space between the honeycomb segments". Therefore, films to prevent open ends of cells from being closed with the bonding materials do not have to be attached to end faces of the honeycomb segments.

DESCRIPTION OF THE PREFERRED EMBODIMENTS

Figure 1:
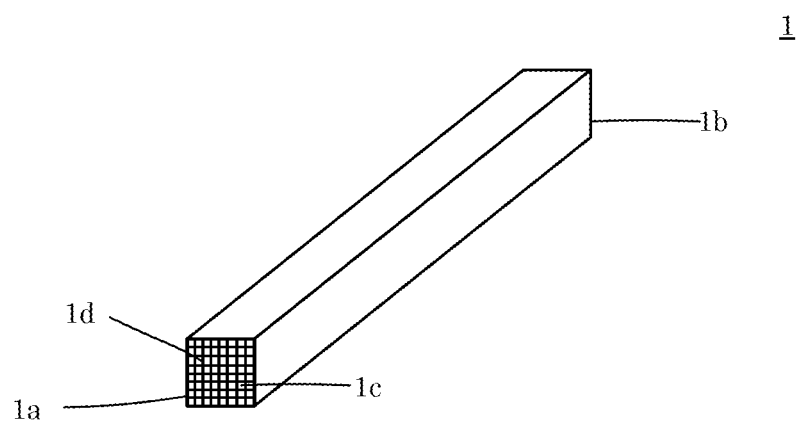
FIG. 1 is a perspective view schematically showing a quadrangular prismatic honeycomb formed body formed in a manufacturing process of a honeycomb structure in one embodiment of a manufacturing method of the honeycomb structure of the present invention.

Next, a mode for carrying out the present invention will be described in detail with reference to the drawings. However, it should be understood that the present invention is not limited to the following embodiment and that a change, an improvement or the like of design is suitably added on the basis of ordinary knowledge of a person skilled in the art without departing from the gist of the present invention.

One embodiment of a manufacturing method of a honeycomb structure of the present invention has a forming step, a firing step, a sheet-like bonding material attaching step, a honeycomb block body preparing step, and a grinding step. Furthermore, a shearing strength of the obtained honeycomb structure is 200 kPa or more. Hereinafter, the respective steps will be described with reference to FIG. 1 to FIG. 6. The forming step is a step of forming a forming raw material into a plurality of quadrangular prismatic honeycomb formed bodies 1 each having partition walls 1$d$ defining a plurality of cells 1$c$ which become through channels for a fluid and extend from one end face 1$a$ to the other end face 1$b$. The firing step is a step of firing the plurality of honeycomb formed bodies 1 to form a plurality of quadrangular prismatic honeycomb fired bodies 2. The sheet-like bonding material attaching step is a step of attaching sheet-like bonding materials 3 to at least part of side surfaces 2$a$ of at least part of the plurality of honeycomb fired bodies 2. The honeycomb block body preparing step is a step of assembling the plurality of quadrangular prismatic honeycomb fired bodies 2 while bonding the side surfaces 2$a$ thereof to one another by the bonding materials 3 to prepare a honeycomb block body 5 in which the plurality of honeycomb fired bodies 2 are stacked. The grinding step is a step of grinding a circumferential portion of the honeycomb block body 5 to obtain a honeycomb structure 100.

Figure 2:
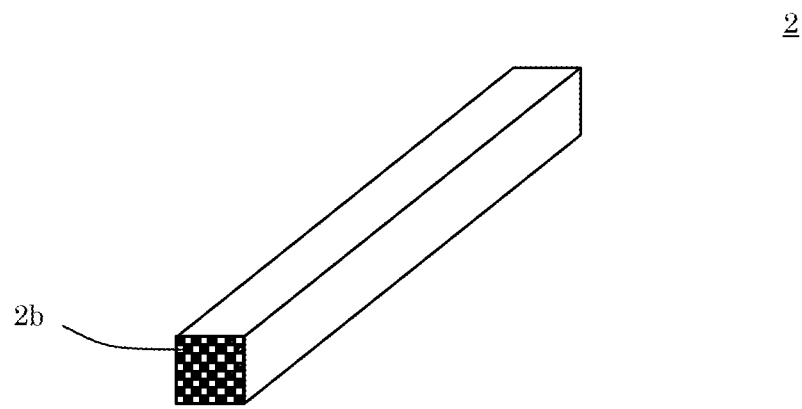
FIG. 2 is a perspective view schematically showing a quadrangular prismatic honeycomb fired body formed in the manufacturing process of the honeycomb structure in the one embodiment of the manufacturing method of the honeycomb structure of the present invention.
Figure 3:
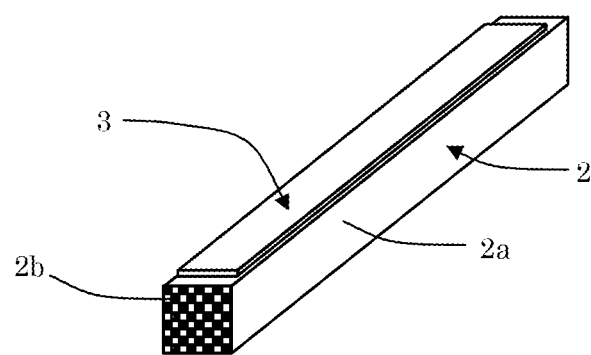
FIG. 3 is a perspective view schematically showing a state where a bonding material is attached to a side surface of the honeycomb fired body in the one embodiment of the manufacturing method of the honeycomb structure of the present invention.
Figure 4:
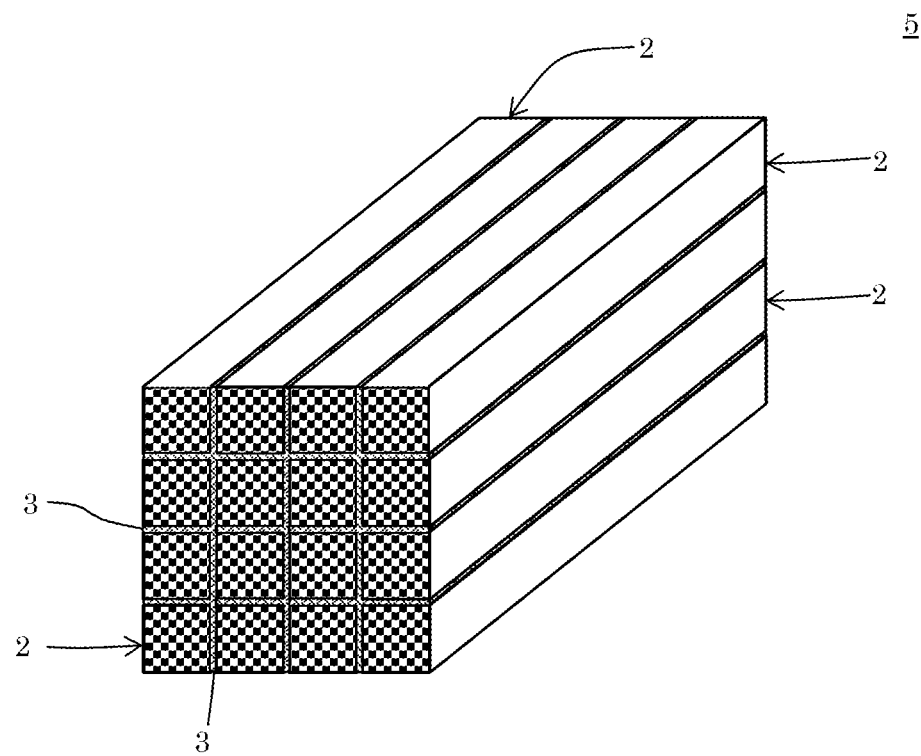
FIG. 4 is a perspective view schematically showing a honeycomb block body formed in the manufacturing process of the honeycomb structure in the one embodiment of the manufacturing method of the honeycomb structure of the present invention.
Figure 5:
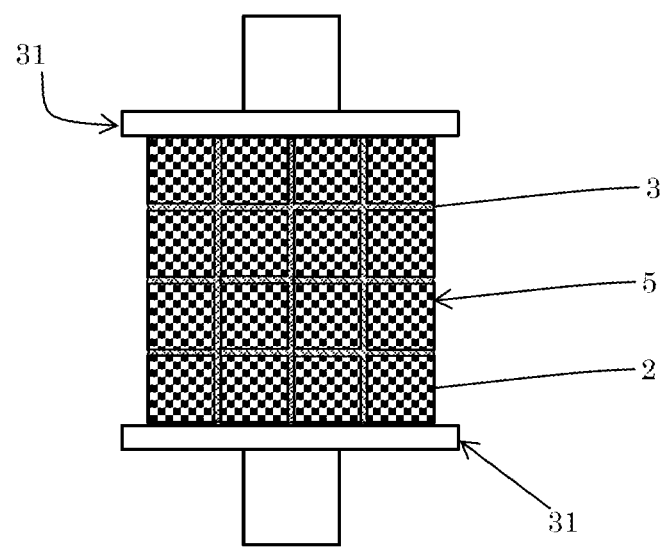
FIG. 5 is a plan view schematically showing a state where the plurality of quadrangular prismatic honeycomb fired bodies are assembled while bonding the side surfaces of the honeycomb fired bodies to one another by the bonding materials to pressurize the honeycomb fired bodies from an outermost circumference toward the inside in the one embodiment of the manufacturing method of the honeycomb structure of the present invention.
Figure 6:
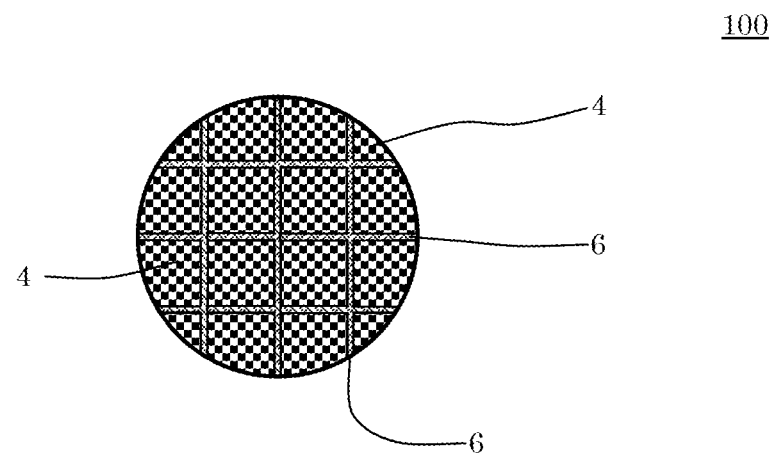
FIG. 6 is a plan view schematically showing the honeycomb structure manufactured in the one embodiment of the manufacturing method of the honeycomb structure of the present invention.

Here, FIG. 1 is a perspective view schematically showing the quadrangular prismatic honeycomb formed body 1 formed in a manufacturing process of the honeycomb structure in one embodiment of the manufacturing method of the honeycomb structure of the present invention. FIG. 2 is a perspective view schematically showing the quadrangular prismatic honeycomb fired body 2 formed in the manufacturing process of the honeycomb structure in the one embodiment of the manufacturing method of the honeycomb structure of the present invention. FIG. 3 is a perspective view schematically showing a state where the bonding material 3 is attached to the side surface 2$a$ of the honeycomb fired body 2 in the one embodiment of the manufacturing method of the honeycomb structure of the present invention. FIG. 4 is a perspective view schematically showing the honeycomb block body 5 formed in the manufacturing process of the honeycomb structure in the one embodiment of the manufacturing method of the honeycomb structure of the present invention. FIG. 5 is a plan view schematically showing a state where the plurality of quadrangular prismatic honeycomb fired bodies 2 are assembled while bonding the side surfaces 2$a$ of the honeycomb fired bodies to one another by the bonding materials 3 to pressurize the honeycomb fired bodies from an outermost circumference toward the inside in the one embodiment of the manufacturing method of the honeycomb structure of the present invention. FIG. 6 is a plan view schematically showing the honeycomb structure 100 manufactured in the one embodiment of the manufacturing method of the honeycomb structure of the present invention.

According to the one embodiment of the manufacturing method of the honeycomb structure of the present invention, the bonding material is attached in the form of a sheet, and hence a space between honeycomb segments is easily made uniform, so that it is not necessary to dispose a spacer in a space between the honeycomb segments to be bonded. Furthermore, the bonding material is attached in the form of the sheet, and hence it is possible to omit or reduce substrate treatments of the surfaces of the honeycomb segments. In addition, the side surfaces of the plurality of honeycomb segments are bonded to one another by the sheet-like bonding materials, and hence it is possible to inhibit "the bonding material sandwiched between the honeycomb segments from protruding from the space between the honeycomb segments". Therefore, films to prevent open ends of the cells from being closed with the bonding materials do not have to be attached to end faces of the honeycomb segments. Hereinafter, each step of a manufacturing method of the honeycomb structure of the present embodiment will be described.

(1) Forming Step:

First, a binder, a surfactant, a pore former, water and the like are preferably added to a ceramic raw material to prepare a forming raw material. The ceramic raw material is preferably at least one selected from the group consisting of silicon carbide, a silicon-silicon carbide-based composite material, a cordierite forming raw material, cordierite, mullite, alumina, titania, spinel, a silicon carbide-cordierite-based composite material, lithium aluminum silicate, aluminum titanate, and an iron-chromium-aluminum-based alloy. Among these raw materials, silicon carbide or the silicon-silicon carbide-based composite material is preferable. It is to be noted that the cordierite forming raw material is the ceramic raw material prepared to obtain a chemical composition in which silica is in a range of 42 to 56 mass %, alumina is in a range of 30 to 45 mass %, and magnesia is in a range of 12 to 16 mass %, and the raw material becomes cordierite when fired. When the silicon-silicon carbide-based composite material is used, a mixture of silicon carbide powder and metal silicon powder is used as the ceramic raw material.

Examples of the binder include methylcellulose, hydroxypropoxyl cellulose, hydroxyethyl cellulose, carboxymethylcellulose, and polyvinyl alcohol. Among these binders, methylcellulose and hydroxypropoxyl cellulose are preferably used together. A content of the binder is preferably from 3 to 15 parts by mass to 100 parts by mass of the ceramic raw material.

A content of the water is preferably from 20 to 90 parts by mass to 100 parts by mass of the ceramic raw material.

As the surfactant, ethylene glycol, dextrin, fatty acid soap, polyalcohol or the like is usable. These surfactants may be used alone, or any combination of these two or more surfactants may be used.

There is not any special restriction on the pore former, as long as the pore former becomes pores after fired, and examples of the pore former include starch, a foamable resin, a water absorbable resin, silica gel, and carbon. A content of the pore former is preferably from 0 to 45 parts by mass to 100 parts by mass of the ceramic raw material.

Next, the forming raw material is preferably prepared to form the quadrangular prismatic honeycomb formed body 1 in which a shape of a cross section perpendicular to a central axis is rectangular. The number of the honeycomb formed bodies can suitably be determined in accordance with a shape and a size of the honeycomb structure to be prepared. The plurality of honeycomb formed bodies preferably have the same shape. When the forming raw material is prepared, the forming raw material is first kneaded to form a kneaded material. There is not any special restriction on a method of kneading the forming raw material to form the kneaded material, and an example of the method is a method in which, for example, a kneader or a vacuum pugmill is used. Furthermore, the kneaded material is extruded to form the quadrangular prismatic honeycomb formed body 1 as shown in FIG. 1. The honeycomb formed body 1 has the partition walls 1d defining the plurality of cells 1c which become the through channels for the fluid and extend from the one end face 1a to the other end face 1b, and the honeycomb formed body has the quadrangular prismatic shape in which the cross section perpendicular to the central axis (perpendicular to a cell extending direction) is rectangular. The shape of the cross section perpendicular to the central axis of the honeycomb formed body 1 is preferably square. There is not any special restriction on a method of forming the kneaded material to form the honeycomb formed body, and a heretofore known forming method such as extrusion is usable. An example of the method is preferably a method of performing the extrusion by use of a die having a desirable cell shape, partition wall thickness and cell density to form the honeycomb formed body. A material of the die is preferably cemented carbide which is hard to wear away. There is not any special restriction on a cell shape, a partition wall thickness and a cell density of the honeycomb formed body.

Next, the obtained honeycomb formed body is preferably dried. There is not any special restriction on a drying method, and examples of the method include electromagnetic wave heating systems such as microwave heating drying and high-frequency dielectric heating drying, and external heating systems such as hot air drying and superheated steam drying. Among these methods, it is preferable that a predetermined amount of water is dried by the electromagnetic wave heating system and then the residual water is dried by the external heating system, because the whole formed body can rapidly and evenly be dried so that any cracks are not generated. As drying conditions, it is preferable that the water of 30 to 95 mass % of the amount of the water before the drying is removed by the electromagnetic wave heating system and then the amount of the water is decreased down to 3 mass % or less by the external heating system. As the electromagnetic wave heating system, the dielectric heating drying is preferable, and as the external heating system, the hot air drying is preferable. A drying temperature is preferably from 90 to 180° C. A drying time is preferably from one to ten hours.

Next, when a length of the honeycomb formed body in a central axis direction (the length in the cell extending direction) is not a desirable length, both end faces (both end portions) are preferably cut to obtain the desirable length. There is not any special restriction on a cutting method, but an example of the method is a method in which a double head round saw cutter or the like is used. Furthermore, all the plurality of honeycomb formed bodies preferably have the same shape and the same size. There is not any special restriction on the length of the honeycomb formed body, and the honeycomb formed body can have a desirable length.

Next, as to the honeycomb fired body, plugging portions 2b are preferably formed in open ends of predetermined cells in one end face and open ends of the residual cells in the other end face. In the honeycomb formed body in which the plugging portions 2b are formed, the predetermined cells including the plugging portions 2b formed on one end face side and the residual cells including the plugging portions 2b formed on the other end face side are preferably alternately arranged to form checkered patterns in both the end faces. When the plugging portions 2b are formed in the honeycomb formed bodies, the honeycomb structure to be obtained becomes a plugged honeycomb structure.

There is not any special restriction on a method of plugging the honeycomb formed bodies, but an example of the method is the following method. A sheet is attached to the one end face of each honeycomb formed body, and then holes are made at positions of the sheet corresponding to the cells in which the plugging portions 2b are to be formed. Then, the end face of the honeycomb formed body to which the sheet is attached is immersed into a plugging slurry in which a constitutional material of the plugging portions 2b is slurried, and the plugging slurry is charged into open end portions of the cells which are to be plugged through the holes made in the sheet. In addition, as to the other end face of the honeycomb formed body, plugging portions 2b are formed in the cells in which the plugging portions 2b are not formed in the one end face by a method similar to the above method of forming the plugging portions 2b in the one end face (the plugging slurry is charged). As the constitutional material of the plugging portions 2b, the same material as that of the honeycomb formed body is preferably used. The plugging portions 2b may be formed in honeycomb fired bodies obtained by firing the honeycomb formed bodies. When the plugging portions 2b are formed in the honeycomb fired bodies, for the purpose of solidifying the plugging portions 2b and bringing the plugging portions 2b into contact closely with the partition walls, a heat treatment, the firing or the like is preferably performed if necessary after the plugging portions 2b are performed.

(2) Firing Step:

Next, the respective honeycomb formed bodies are fired to obtain the plurality of quadrangular prismatic honeycomb fired bodies 2 shown in FIG. 2. The plurality of honeycomb fired bodies preferably have the same shape. To remove the binder and the like before the firing, degreasing (calcinating) is preferably performed. The calcinating is preferably performed by retaining a temperature of 400 to 500° C. as the highest temperature in the air atmosphere for 0.5 to 20 hours. There is not any special restriction on a calcinating and firing method, and the firing can be performed by using an electric furnace, a gas furnace or the like. In the case of silicon carbide or the silicon-silicon carbide-based composite material, as firing conditions, the heating is preferably performed by retaining a temperature of 1300 to 1500° C. as the highest temperature in an inert atmosphere of nitrogen, argon or the like for one to ten hours.

The partition walls of the honeycomb fired bodies are preferably porous. A porosity of the partition walls of the honeycomb fired bodies is preferably from 25 to 80%, further preferably from 30 to 70%, and especially preferably from 35 to 65%. When a range of the porosity has such values, a pressure loss can be reduced while maintaining a strength. When the porosity is smaller than 25%, the pressure loss rises sometimes. When the porosity is in excess of 80%, the strength lowers, and a thermal conductivity lowers sometimes. The porosity is a value measured by Archimedes method.

An average pore diameter of the partition walls of the honeycomb fired bodies is preferably from 5 to 70 µm. The average pore diameter having such a value makes it possible for a particulate matter (PM) to be effectively trapped when the prepared honeycomb structure is used as a filter. When the average pore diameter is smaller than 5 µm, the pores are easily clogged with the particulate matter (PM) sometimes. When the average pore diameter is in excess of 70 µm, the particulate matter (PM) is not trapped by the filter but passes the filter sometimes. The average pore diameter is a value measured by a mercury porosimeter.

When a material of the partition walls of the honeycomb fired bodies is silicon carbide, an average particle diameter of silicon carbide particles is preferably from 1 to 50 µm. When the average particle diameter is in such a range, the obtained honeycomb fired bodies have the advantage that the porosity and pore diameters can easily suitably be controlled. When the average particle diameter is smaller than 1 µm, the pore diameters become excessively small, and when the average particle diameter is larger than 50 µm, the porosity becomes small sometimes. When the pore diameters are excessively small, the pores are easily clogged with the particulate matter (PM), and when the porosity is excessively small, the pressure loss rises sometimes. The average particle diameter is a value measured by using a particle size distribution measuring device.

There is not any special restriction on a cell shape of each honeycomb fired body (the cell shape in a cross section of the honeycomb fired body which is vertical to a central axis of the honeycomb fired body (the cell extending direction)), and examples of the cell shape include a triangular shape, a quadrangular shape, a hexagonal shape, an octagonal shape, a circular shape and any combination of these shapes. When the plugging portions 2b are disposed, the combination of the octagonal shape and the quadrangular shape is also another suitable example.

A thickness of the partition walls of the honeycomb fired bodies is preferably from 100 to 600 µm, further preferably from 150 to 500 µm, and especially preferably from 200 to 400 µm. When the thickness of the partition walls is smaller than 100 µm, the strength of the obtained honeycomb structure lowers sometimes. When the thickness is larger than 600 µm, the pressure loss enlarges sometimes. Furthermore, there is not any special restriction on the cell density of the honeycomb fired body, but the cell density is preferably from 5 to 80 cells/cm$^2$, further preferably from 20 to 60 cells/cm$^2$, and especially preferably from 30 to 50 cells/cm$^2$. When the cell density is smaller than 5 cells/cm$^2$, a filtering area of the obtained honeycomb structure used as the filter is reduced sometimes. When the cell density is larger than 80 cells/cm$^2$, the pressure loss enlarges sometimes.

A size (a vertical size×a horizontal size×a length (the length in the central axis direction)) of the honeycomb fired body is preferably from 30 mm×30 mm×100 mm to 45 mm×45 mm×400 mm.

(3) Sheet-Like Bonding Material Attaching Step:

Next, the sheet-like bonding materials 3 are preferably attached to at least part of the side surfaces 2a of at least part of the plurality of honeycomb fired bodies 2 (see FIG. 3). The bonding materials 3 are preferably suitably attached to the side surfaces of the respective honeycomb fired bodies so that "the bonding material is charged into each 'space between the honeycomb fired body and the honeycomb fired body', when the honeycomb block body is prepared".

The bonding material preferably contains agar, water, a ceramic raw material, and a pore former, and for the purpose of improving the strength of the bonding material itself, the bonding material preferably contains an inorganic binder such as silica sol or alumina sol, and an organic binder such as methylcellulose, cellulose, PVA, PVB or an water absorbable resin. When the agar is added to the bonding material and the pasted bonding material is shaped in the form of the sheet, it is possible to handle the bonding material by taping, casting or another technology, thereby increasing a yield of the bonding material more than a conventional method. Furthermore, a hardness and water separation properties peculiar to the agar are utilized, so that any spacer or substrate to maintain a bonding width can be made unnecessary.

A content ratio of the agar to be contained in the bonding material is preferably from 0.08 to 0.40 mass %. When the mass percentage is smaller than 0.08 mass %, it is difficult to shape the bonding material in the form of the sheet sometimes. When the mass percentage is larger than 0.40 mass %, a bonding strength between the bonding material and the honeycomb fired body lowers, and the bonding material and the honeycomb fired body peel off sometimes in an interface therebetween.

A content ratio of the water to be contained in the bonding material is preferably from 20 to 45 mass %. When the mass percentage is smaller than 20 mass %, the water is insufficient, and hence the bonding material is not hardened in the form of the sheet sometimes. When the mass percentage is larger than 45 mass %, it is difficult to shape the bonding material in the form of the sheet sometimes.

As the ceramic raw material to be contained in the bonding material, a material similar to the ceramic raw material (silicon carbide or the like: see "Forming Step") for use during the preparation of the above honeycomb fired bodies is preferably used. The ceramic raw material for use in the bonding material is preferably the same as the ceramic raw material for use during the preparation of the honeycomb fired bodies, but may be different therefrom. A content ratio of the ceramic raw material to be contained in the bonding material is preferably from 20 to 40 mass %, and when the mass percentage is smaller than 20 mass %, the strength of the bonding material lowers sometimes. When the mass percentage is larger than 40 mass %, the bonding material thermally expands too much, which causes the generation of the cracks in the bonding materials and the honeycomb fired bodies sometimes. An average particle diameter of the ceramic raw material for use in the bonding materials is preferably in a range of 10 to 80% of the average particle diameter of the ceramic raw material for use during the preparation of the honeycomb fired bodies. In such a range, the bonding strength of each bonding portion in the obtained honeycomb structure can further be enhanced.

The pore former to be contained in the bonding material preferably contains the foamable resin. A content ratio of the foamable resin is preferably from 0 to 10 mass %. When the content ratio of the foamable resin is in such a range, the foamable resin does not have any influence on characteristics of the material.

The bonding material preferably contains silicon carbide, alumina, titania, cordierite, mullite, mica, a pore former such as the foamable resin, the organic binder (MC, CMC, PVA, or PVB), colloidal silica, alumina silicate fibers or the other fibers, a dispersant and the like. Examples of the organic binder include MC (methylcellulose), CMC (carboxymethylcellulose), PVA (polyvinyl alcohol), and PVB (polyvinyl butyral). The bonding material is a component to promote the mutual bonding of the honeycomb fired bodies.

A thickness of each sheet-like bonding material (before attached) is preferably from 0.5 to 6.0 mm, further preferably from 1 to 4.0 mm, and especially preferably from 1.5 to 3.0 mm. When the thickness is smaller than 0.5 mm, a bonding area between the bonding material and each honeycomb fired body decreases, and the bonding strength lowers sometimes. When the thickness is larger than 6.0 mm, an amount of the bonding material protruding from the space between the honeycomb fired bodies increases, and an amount of the bonding material to be used increases sometimes.

A compressive strength of the bonding material is preferably from 5 to 55 N, further preferably from 10 to 30 N, and especially preferably from 15 to 20 N. The compressive strength is in such a range, and hence a distance between the adjacent honeycomb fired bodies (honeycomb segments) can be adjusted in accordance with the thickness of the sheet-like bonding material and a pressure during the pressurizing in the honeycomb block body preparing step. Therefore, it is not necessary to use any spacer, when the honeycomb fired bodies are bonded to one another. When the compressive strength is lower than 5 N, the bonding material is so soft that the sheet form is hard to be maintained sometimes. When the compressive strength is higher than 55 N, the bonding material is so hard that the honeycomb fired bodies cannot easily be bonded to one another.

The bonding material may have such a size that the bonding material protrudes from the side surface, when the bonding material is attached to the side surface of the honeycomb fired body, but the bonding material preferably has such a size that the bonding material does not protrude from the side surface. Furthermore, when the bonding material is attached to the side surface of the honeycomb fired body, a distance from an outer circumference of the bonding material to an outer circumference of the side surface of the honeycomb fired body (a width of an exposed circumferential portion of the side surface of the honeycomb fired body) is preferably from 0 to 5 mm. The "distance (width)" is further preferably from 2 to 5 mm and especially preferably from 3 to 5 mm. When the distance is larger (wider) than 5 mm, the bonding material is hard to spread over the whole side surface of the honeycomb fired body, and a gap is generated between the honeycomb segments of the obtained honeycomb structure sometimes. It is to be noted that when the distance is shorter (narrower) than 3 mm, the bonding material noticeably easily protrudes from the space between the honeycomb fired bodies.

The bonding material is beforehand shaped in the form of the sheet that is independently formed of all of the plurality of honeycomb fired bodies and is then attached to the side surface of the honeycomb fired body. Examples of a method of shaping the bonding material in the form of the sheet include casting and extrusion.

When the sheet-like bonding material is prepared, the ceramic raw material, a cement material, the pore former, the water, an agar aqueous solution and the like are preferably mixed to obtain a bonding material forming raw material, and the bonding material forming raw material is preferably shaped in the form of the sheet. A content ratio of the agar in the agar aqueous solution is preferably from 0.1 to 5.0 mass %. When the mass percentage is smaller than 0.1 mass %, the bonding material cannot be hardened in the form of the sheet sometimes. When the mass percentage is larger than 5.0 mass %, the bonding material is excessively hardened, and bonding properties to the honeycomb fired body deteriorate sometimes. Furthermore, the agar aqueous solution preferably contains an inorganic binder such as the silica sol. A content ratio of the inorganic binder in the agar aqueous solution is preferably from 5 to 50 mass %. When the mass percentage is smaller than 5 mass %, the strength of the bonding material does not rise sometimes. When the mass percentage is larger than 50 mass %, pores of the bonding material increase and the strength of the bonding material lowers due to an influence of the water present in the silica sol.

In the manufacturing method of the honeycomb structure of the present embodiment, the honeycomb fired body does not have to be subjected to any substrate treatment before the bonding material is attached to the honeycomb fired body, but the substrate treatment may be performed. A substrate material for use in the substrate treatment preferably contains a ceramic raw material, water, a binder and the like. The ceramic raw material is preferably the same as the ceramic raw material used in the preparation of the honeycomb fired body. A content ratio of the ceramic raw material to be contained in the substrate material is preferably from 30 to 60 mass %. A content ratio of the water to be contained in the substrate material is preferably from 5 to 40 mass %. The binder to be contained in the substrate material is preferably inorganic binder. A content ratio of the binder to be contained in the substrate material is preferably from 10 to 50 mass %.

(4) Honeycomb Block Body Preparing Step:

Next, the plurality of quadrangular prismatic honeycomb fired bodies are assembled while bonding the side surfaces of the respective honeycomb fired bodies to one another by the bonding materials, to prepare the honeycomb block body 5 in which the plurality of honeycomb fired bodies 2 are stacked and formed as shown in FIG. 4.

When the honeycomb fired bodies 2 are stacked to prepare the honeycomb block body 5, a pressure is preferably applied to the stacked honeycomb fired bodies 2 by a pressurizing jig 31 as shown in FIG. 5. The pressure is applied from a direction shown in FIG. 5, and then the pressure is preferably applied from a direction vertical to this direction. In consequence, it is preferable that the honeycomb fired bodies are firmly bonded and that the thickness of the bonding material is set to a desirable thickness (the distance between the adjacent honeycomb fired bodies is set to a desirable distance). As the pressurizing jig 31, it is preferable to use a steel plate capable of transmitting a desirable pressure to the honeycomb fired bodies 2 by a hydraulic, pneumatic or electric cylinder. The pressure to be applied to the honeycomb fired bodies 2 is preferably from 1 to 20 MPa. When the pressure is smaller than 1 MPa, the honeycomb fired bodies peel off sometimes due to insufficient pressurizing. When the pressure is larger than 12 MPa, there is the tendency that the bonding width decreases.

In the honeycomb block body 5, a thickness of the bonding material 3 (the distance between the adjacent honeycomb fired bodies 2 and 2) is preferably from 0.5 to 1.5 mm. When the thickness is smaller than 0.5 mm, a buffering effect deteriorates sometimes. When the thickness is larger than 1.5 mm, the pressure loss of the obtained honeycomb structure used as an exhaust gas treating filter or the like enlarges sometimes. It is to be noted that the thickness of the bonding material 3 is an average value, and a measuring method is as follows. An image measuring system (e.g., "a CNC image measuring system NEXIV by Nicon Corporation") is allowed to recognize images of both the end faces of the honeycomb structure, thicknesses (bonding widths) of 12 points of a bonding portion of each of the end faces are measured, and obtained values are averaged. Measuring points are the 12 points in total including eight points of a circumferential portion and four points of a central portion.

When the honeycomb block body 5 is prepared, it is preferable that any gap is prevented from being made between the adjacent honeycomb fired bodies 2 and 2. Furthermore, the bonding material is shaped in the form of the sheet, and hence the amount of the bonding material protruding outside from the honeycomb block body is small, when the honeycomb block body 5 is prepared. Additionally, the bonding material has such shape retaining properties that the bonding material is capable of forming the sheet, and hence it is possible to inhibit "the protruded bonding material from flowing downward along each end face of the honeycomb block body 5". Therefore, it is also possible to inhibit "the cell open ends of the end faces of the honeycomb block body 5 from being closed with the bonding material". Therefore, the films to prevent the open ends of the cells from being closed do not have to be attached to the end faces of the honeycomb fired bodies 2.

In the honeycomb block body 5 shown in FIG. 5, the honeycomb fired bodies 2 are arranged in "four rows×four rows=16 bodies", but the number of the honeycomb fired bodies 2 is not limited to this number. The number of the rows and the number of the bodies can be set to desirable numbers.

The honeycomb fired bodies 2 are stacked to perform the above pressurizing operation, and then preferably dried at 80 to 140° C. for three to six hours, to obtain the honeycomb block body in which the respective honeycomb fired bodies are firmly bonded by the bonding material.

(5) Grinding Step:

Next, the circumferential portion of the honeycomb block body is preferably ground to obtain the honeycomb structure 100 shown in FIG. 6. In the honeycomb structure 100, side surfaces of a plurality of honeycomb segments 4 are bonded to one another by bonding portions 6, respectively.

There is not any special restriction on a method of grinding the circumferential portion of the honeycomb block body, but the method is preferably a method of grinding the circumferential portion by use of a cutter, a grinder, a polisher or the like including a linear cutting tool in which diamond abrasive grains and the like are buried.

There is not any special restriction on a shape of the honeycomb structure to be prepared, and examples of the shape include a round pillar shape, a pillar shape in which a cross section perpendicular to a central axis is elliptic, and a pillar shape in which a cross section perpendicular to a central axis has a racetrack shape. Furthermore, there is not any special restriction on a size of the honeycomb structure.

A shearing strength of the obtained honeycomb structure is 200 kPa or more and preferably 400 kPa or more. The shearing strength is a value obtained by the following method. From the obtained honeycomb structure, two adjacent segments in a bonded state are cut out as they are, one of the segments is fixed, and a load is applied to the other segment from a long axis direction thereof to measure the strength. A load is applied, and a maximum load when the two segments are divided is obtained as the shearing strength.

EXAMPLES

Hereinafter, the present invention will further specifically be described in accordance with examples, but the present invention is not limited to these examples.

Example 1

Silicon carbide powder and metal silicon powder were mixed at a mass ratio of 80:20 to obtain a ceramic raw material. Then, the ceramic raw material was mixed with a surfactant, a pore former, a forming assistant material and water and kneaded to prepare a columnar kneaded material by a vacuum pugmill. As the pore former, a foamable resin was used. As the forming assistant material, methylcellulose was used. 2 parts by mass of the pore former was mixed to 100 parts by mass of the ceramic raw material. 5 parts by mass of the forming assistant material was mixed to 100 parts by mass of the ceramic raw material. 29 parts by mass of the water was mixed to 100 parts by mass of the ceramic raw material. An average particle diameter of the silicon carbide powder was 40 µm. The average particle diameter is a value measured by a method in which a particle size analyzing device is used.

The obtained columnar kneaded material was shaped in a honeycomb form by use of an extrusion machine, dried by high-frequency dielectric heating, and then dried at 120° C. for five hours by using a hot air dryer, and each of end faces was cut as much as a predetermined amount to obtain a quadrangular prismatic honeycomb formed body. In the obtained honeycomb formed body, a thickness of partition walls was 310 μm, a cell density was 46.5 cells/cm$^2$ (300 cells/square inch), a bottom surface had a square shape of 35 mm×35 mm, and a length was 152 mm. 16 honeycomb formed bodies were prepared.

As to the obtained honeycomb formed bodies, plugging portions were formed in end portions of the respective cells so that mutually opposite end portions of the adjacent cells were closed and both the end faces possessed checkered patterns. As a plugging charging material, a material similar to that of the honeycomb formed bodies was used. A depth of each plugging portion (the depth in a cell extending direction) was 6 mm. The plugging portions were formed and then the plugged honeycomb formed bodies were dried at 120° C. for five hours by using the hot air dryer.

Afterward, degreasing (calcinating), in which the honeycomb formed bodies were placed into an atmospheric furnace with a deodorizing device in the air atmosphere, and heated at 450° C. for five hours, was carried out. Afterward, firing (main firing) was performed at about 1450° C. in an inert atmosphere of argon for two hours to obtain quadrangular prismatic honeycomb fired bodies in which SiC crystal particles were bonded with Si and each of which had a square bottom surface.

Each of the obtained honeycomb fired bodies with the bottom surface having the square shape of 35 mm×35 mm, and had a length of 152 mm. Furthermore, partition walls of the obtained honeycomb fired body were porous. An average pore diameter of the honeycomb fired body was 14 μm and a porosity thereof was 42%. The average pore diameter is a value measured by a mercury porosimeter and the porosity is a value measured by Archimedes method.

Next, a substrate material was applied to a side surface of the honeycomb fired body. The substrate material was prepared by mixing respective materials so as to obtain a composition including 38 mass % of silicon carbide, 24 mass % of water and 38 mass % of colloidal silica.

Next, a film made of a resin was attached to each end face of the honeycomb fired body.

Next, spacers were attached to four corners of each side surface of the honeycomb fired body by use of a spacer material and application equipment. As each spacer, a disc-like formed body of 5 mm (a diameter)×1 mm (a thickness) was used. A material of the spacer contained 43 mass % of silicon carbide, 23 mass % of silica sol, 2 mass % of an inorganic assistant material and 32 mass % of ceramic fibers.

Next, each sheet-like bonding material was attached to the side surface of the honeycomb fired body. At this time, the bonding material was suitably attached to each specific side surface in each honeycomb fired body so that such a honeycomb block body as shown in FIG. 4 was formed.

Each sheet-like bonding material was prepared as follows. A raw material to form the bonding material (a bonding material forming raw material) was obtained by mixing respective raw materials so as to obtain a composition including 28 mass % of silicon carbide, 1 mass % of a foamable resin, 11 mass % of water, 1 mass % of agar, 57 mass % of a cement material and 2 mass % of silica sol or the like. A breakdown of 57 mass % of the cement material was 22 mass % of alumina silicate fibers, 14 mass % of colloidal silica, 1 mass % of organic binders (bentonite and CMC), 1 mass % of a dispersant (Porinon or Molnon) and 19 mass % of water. At this time, as to the agar, 1 mass % of agar water was first prepared and the agar water was mixed with the other raw materials.

Next, the bonding material forming raw material was cast to prepare each sheet-like bonding material. The bonding material was shaped in the form of a sheet of 35 mm×137 mm×3 mm (a thickness). A compressive strength of the bonding material was 15 N. The compressive strength is a value measured by a method described in the following.

Next, 16 honeycomb fired bodies were assembled while bonding the 16 honeycomb fired bodies by the bonding material, and pressurized by using a pressurizing jig so as to tighten from an outermost circumference toward the inside (see FIG. 5) to prepare the honeycomb block body (the honeycomb fired bodies: four rows×four rows) as shown in FIG. 4. As a pressurizing jig 31, there was specifically used a carbon steel plate in which a synthetic rubber was attached to a contact portion with the honeycomb fired bodies. The pressurizing was performed by using an oil pressure.

Next, a circumferential portion of the honeycomb block body was ground to prepare a round pillar-shaped honeycomb structure 100 shown in FIG. 6. A diameter of a bottom surface of the obtained honeycomb structure was 143 mm.

Thicknesses (bonding widths) of bonding portions of the obtained honeycomb structure were approximately constant, and an average value was 1.0 mm. The average value was obtained by the following method. "A CNC image measuring system NEXIV by Nicon Corporation" was allowed to recognize images of both end faces of the honeycomb structure. Then, thicknesses (bonding widths) of 12 points of a bonding portion of each of the end faces were measured and averaged. Measuring points were the 12 points in total including eight points of a circumferential portion and four points of a central portion.

As to the obtained honeycomb structure, when a shearing strength test was carried out by the following method, a shearing strength was 850 kPa. Table 1 shows the results.

(Compressive Strength)

A jig for use in measurement of a gel strength was attached to "Instron 5500 series by INSTRON Corporation". A bulk body of a bonding material was set to the jig and a compressive load was applied thereto to measure the strength. A shape of the bulk body of the bonding material was a columnar shape having a diameter of 50 mm×a height of 50 mm. As measurement conditions, the measuring was performed at a rate of "1.0 mm/min".

(Shearing Strength)

From the honeycomb structure, two adjacent segments in a bonded state were cut out as they were, one of the segments was fixed, and a load was applied to the other segment from a long axis direction thereof to measure the shearing strength. A load was applied, and a maximum load when the two segments were divided was obtained as the shearing strength. A shearing strength of 200 kPa or more was admitted as getting a pass.

TABLE 1

| | Bonding material | | | | | | | | Bonding conditions | | | Test result | |
|---|---|---|---|---|---|---|---|---|---|---|---|---|---|
| | | Input amount | | | Ceramic raw material content ratio (mass %) | Fibers (mass %) | Inorganic binder (mass %) | Water content ratio (mass %) | Substrate material treatment Present/Absent | End face protective film Present/Absent | Spacer Present/Absent | Compressive strength (N) | Shearing strength 200 kPa≤ |
| | State | Agar content ratio (mass %) | of agar aqueous solution (mass %) | Thickness of sheet (mm) | | | | | | | | | |
| EX. 1 | Sheet-like | 0.13 | 15.00 | 3.0 | 30 | 23 | 15 | 29 | Present | Present | Present | 12 | 850 kPa |
| EX. 2 | Sheet-like | 0.08 | 15.00 | 1.0 | 28 | 21 | 14 | 34 | Absent | Absent | Absent | 5 | 730 kPa |
| EX. 3 | Sheet-like | 0.40 | 15.00 | 1.0 | 29 | 23 | 14 | 31 | Absent | Absent | Absent | 55 | 460 kPa |
| EX. 4 | Sheet-like | 0.13 | 15.00 | 0.5 | 30 | 23 | 15 | 29 | Absent | Absent | Absent | 12 | 720 kPa |
| EX. 5 | Sheet-like | 0.13 | 15.00 | 6.0 | 30 | 23 | 15 | 29 | Absent | Absent | Absent | 12 | 700 kPa |
| EX. 6 | Sheet-like | 0.13 | 15.00 | 3.0 | 20 | 26 | 16 | 35 | Absent | Absent | Absent | 12 | 650 kPa |
| EX. 7 | Sheet-like | 0.13 | 15.00 | 3.0 | 40 | 20 | 13 | 24 | Absent | Absent | Absent | 12 | 750 kPa |
| EX. 8 | Sheet-like | 0.13 | 5.00 | 3.0 | 38 | 24 | 15 | 20 | Absent | Absent | Absent | 10 | 450 kPa |
| EX. 9 | Sheet-like | 0.13 | 30.00 | 3.0 | 26 | 19 | 11 | 45 | Absent | Absent | Absent | 15 | 530 kPa |
| EX. 10 | Sheet-like | 0.50 | 15.00 | 1.0 | 29 | 23 | 14 | 31 | Absent | Absent | Absent | 60 | 350 kPa |
| EX. 11 | Sheet-like | 0.13 | 15.00 | 0.3 | 30 | 23 | 15 | 29 | Absent | Absent | Absent | 12 | 200 kPa |
| EX. 12 | Sheet-like | 0.13 | 15.00 | 7.0 | 30 | 23 | 15 | 29 | Absent | Absent | Absent | 12 | 230 kPa |
| EX. 13 | Sheet-like | 0.13 | 15.00 | 3.0 | 15 | 28 | 18 | 36 | Absent | Absent | Absent | 12 | 230 kPa |
| EX. 14 | Sheet-like | 0.13 | 15.00 | 3.0 | 45 | 18 | 11 | 23 | Absent | Absent | Absent | 12 | 300 kPa |
| EX. 15 | Sheet-like | 0.13 | 40.00 | 3.0 | 23 | 15 | 12 | 47 | Absent | Absent | Absent | 30 | 300 kPa |
| Com. EX. 1 | Pasted | — | — | — | 35 | 26 | 17 | 19 | Present | Present | Present | — | 795 kPa |
| Com. EX. 2 | Sheet-like | 0.03 | 15.00 | 1.0 | 30 | 20 | 12 | 35 | Absent | Absent | Absent | Unmeasurable | — |
| Com. EX. 3 | Sheet-like | 0.10 | 3.00 | 3.0 | 38 | 28 | 16 | 15 | Absent | Absent | Absent | 30 | 100 kPa |
| Com. EX. 4 | Sheet-like | 0.13 | 15.00 | 0.3 | 10 | 42 | 20 | 25 | Absent | Absent | Absent | 10 | 150 kPa |
| Com. EX. 5 | Sheet-like | 0.80 | 15.00 | 3.0 | 15 | 30 | 12 | 40 | Absent | Absent | Absent | 100 | 50 kPa |

Examples 2 to 15

The procedures of Example 1 were repeated except that respective conditions were changed as shown in Table 1, to prepare honeycomb structures. The procedures of Example 1 were repeated to measure "bonding widths", "compressive strengths" and "shearing strengths". Each "bonding width" was 1.0 mm. Table 1 shows the measurement results of "the compressive strength" and "the shearing strength".

Comparative Example 1

The procedures of Example 1 were repeated to prepare 16 honeycomb fired bodies.

Next, a substrate material was applied to side surfaces of the honeycomb fired bodies. The substrate material was prepared by mixing respective materials so as to obtain a composition including 38 mass % of silicon carbide, 24 mass % of water and 38 mass % of colloidal silica.

Next, a film made of a resin was attached to each end face of each honeycomb fired body.

Next, spacers were attached to four corners of the side surface of the honeycomb fired body by use of a spacer material and application equipment. As each spacer, a disc-like formed body of 5 mm (a diameter)×1 mm (a thickness) was used. A material of the spacer contained 43 mass % of silicon carbide, 23 mass % of silica sol, 2 mass % of an inorganic assistant material and 32 mass % of ceramic fibers.

Next, a pasted bonding material was applied to the side surface of the honeycomb fired body. A composition of the bonding material included 64 mass % of a cement material, 34 mass % of silicon carbide, 1 mass % of a foamable resin and 1 mass % of water. An average value of thicknesses of the bonding materials was 1 mm. The bonding material was applied to the whole side surface.

Next, 16 honeycomb fired bodies were assembled while bonding the bodies by the bonding material, and pressurized by using a pressurizing jig so as to tighten from an outermost circumference toward the inside to prepare such a honeycomb block body (the honeycomb fired bodies: four rows×four rows) as shown in FIG. 4. When the honeycomb fired bodies were bonded, the pasted bonding material protruded and flowed downwards, and hence the bonding material which flowed outside was scraped off. Then, the films attached to the end faces of the honeycomb fired bodies were peeled off.

Next, a circumferential portion of the honeycomb block body was ground to prepare a round pillar-shaped honeycomb structure. A diameter of a bottom surface of the obtained honeycomb structure was 143 mm.

As to the obtained honeycomb structure, when a shearing strength test was carried out, a shearing strength was 795 kPa. Table 1 shows the result. Furthermore, a bonding width was 1.0 mm.

It is seen from Table 1 that when the sheet-like bonding material is used (Example 1), the honeycomb structure has a shearing strength similar to a conventional honeycomb structure in which a pasted bonding material is used.

Additionally, in the manufacturing method of the honeycomb structure of each of Examples 2 to 15, the application of the substrate material was not performed, the attaching of the films to the end faces of the honeycomb fired bodies was not performed, and the using of the spacers was not performed. Even in this case, however, it was possible to obtain the honeycomb structure similar to that of Comparative Example 1 obtained by performing these operations. In consequence, it is seen that in the manufacturing method of the honeycomb structure of each of Examples 2 to 15, production efficiency noticeably improves.

Comparative Examples 2 to 5

The procedures of Example 1 were repeated except that respective conditions were changed as shown in Table 1, to prepare honeycomb structures. The procedures of Example 1 were repeated to measure "bonding widths", "compressive strengths" and "shearing strengths". Each "bonding width" was 1.0 mm. Table 1 shows the measurement results of "the compressive strength" and "the shearing strength".

It is seen from Table 1 that in each of Examples 2 to 15, it is possible to obtain the honeycomb structure excellent in shearing strength. Furthermore, when the sheet-like bonding material was used, a bonding width was uniform at 1.0 mm even in a case where any spacers were not used. Additionally, when the sheet-like bonding material was used, it was possible to inhibit "the bonding material sandwiched between the honeycomb segments from protruding from the space between the honeycomb segments", and it was not necessary to attach the films to the end faces. In addition, it is seen that in Examples 2 to 15, even when the substrate treatment of each honeycomb segment surface is omitted, the honeycomb segments can suitably be bonded to one another (the shearing strength is high). It is seen from Table 1 that in each of Examples 2 to 15, even when the using of the spacer, the attaching of the films and the substrate treatment are not performed, the honeycomb structure having a high shearing strength can be obtained, and the production efficiency improves.

A manufacturing method of a honeycomb structure of the present invention can be utilized to manufacture the honeycomb structure which can suitably be utilized as a carrier for a catalyst device or a filter in each of various fields of cars, chemistry, electric power, iron and steel, and the like.

DESCRIPTION OF REFERENCE SYMBOLS

1: honeycomb formed body, 1a: one end face, 1b: the other end face, 1c: cell, 1d: partition wall, 2: honeycomb fired body, 2a: side surface, 2b: plugging portion, 3: bonding material, 4: honeycomb segment, 5: honeycomb block body, 6: bonding portion, 31: pressurizing jig, and 100: honeycomb structure.

What is claimed is:

1. A manufacturing method of a honeycomb structure comprising:
   a forming step of forming a forming raw material into a plurality of quadrangular prismatic honeycomb formed bodies each having partition walls defining a plurality of cells which become through channels for a fluid and extend from one end face to another end face;
   a firing step of firing the plurality of honeycomb formed bodies to form a plurality of quadrangular prismatic honeycomb fired bodies;
   a sheet-like bonding material forming step of forming the sheet-like bonding material independent of all of the plurality of honeycomb fired bodies;
   a sheet-like bonding material attaching step of attaching sheet-like bonding materials to at least part of side surfaces of at least part of the plurality of honeycomb fired bodies;
   a honeycomb block body preparing step of preparing a honeycomb block body in which the plurality of honeycomb fired bodies are stacked, by assembling the plurality of quadrangular prismatic honeycomb fired bodies while bonding the entire side surfaces thereof to one another by the bonding materials; and a grinding step of grinding a circumferential portion of the honeycomb block body to obtain the honeycomb structure, wherein the bond in material contains 0.08 to 0.40 mass % agar, and wherein a shearing strength of the obtained honeycomb structure is 200 kPa or more.

2. The manufacturing method of the honeycomb structure according to claim 1, wherein the bonding material contains 20 to 45 mass % of water.

3. The manufacturing method of the honeycomb structure according to claim 1, wherein the bonding material contains 20 to 40 mass % of a ceramic raw material.

4. The manufacturing method of the honeycomb structure according to claim 1, wherein a thickness of the bonding material is from 0.5 to 6.0 mm.

5. The manufacturing method of the honeycomb structure according to claim 1, wherein a compressive strength of the bonding material is from 5 to 55 N.

6. The manufacturing method of the honeycomb structure according to claim 1, wherein the sheet-like bonding material is beforehand shaped in the form of a sheet by using casting or extrusion.

* * * * *